(12) United States Patent
Irwin et al.

(10) Patent No.: US 7,391,527 B2
(45) Date of Patent: Jun. 24, 2008

(54) METHOD AND SYSTEM OF USING A MULTIFUNCTION PRINTER TO IDENTIFY PAGES HAVING A TEXT STRING

(75) Inventors: Cory Irwin, Eagle, ID (US); Carl Price, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1010 days.

(21) Appl. No.: 10/425,234

(22) Filed: Apr. 29, 2003

(65) Prior Publication Data

US 2004/0218205 A1　Nov. 4, 2004

(51) Int. Cl.
*G06F 15/00* (2006.01)
*H04N 1/00* (2006.01)

(52) U.S. Cl. ............... 358/1.15; 358/1.13; 358/401; 358/402; 358/474; 358/472; 358/1.2; 358/1.18; 358/440; 382/181; 382/229

(58) Field of Classification Search ............... 358/1.13, 358/1.15, 401, 402; 382/181
See application file for complete search history.

(56) References Cited

U.S. PATENT DOCUMENTS

| | | | |
|---|---|---|---|
| 5,325,297 A | 6/1994 | Bird et al. | |
| 5,619,594 A | 4/1997 | Melen | |
| 5,696,963 A | 12/1997 | Ahn | |
| 6,057,936 A * | 5/2000 | Obara et al. | 358/296 |
| 6,157,465 A * | 12/2000 | Suda et al. | 358/407 |
| 6,385,350 B1 | 5/2002 | Nicholson et al. | |
| 6,480,838 B1 * | 11/2002 | Peterman | 707/3 |
| 6,501,855 B1 | 12/2002 | Zelinski | |
| 6,563,598 B1 * | 5/2003 | Johnson et al. | 358/1.15 |
| 6,636,710 B2 * | 10/2003 | Oyaide | 399/70 |
| 6,775,026 B1 * | 8/2004 | Kato | 358/1.15 |
| 7,161,706 B2 * | 1/2007 | Levin et al. | 358/1.2 |
| 7,263,661 B2 * | 8/2007 | Chavers et al. | 715/744 |
| 2002/0037097 A1 * | 3/2002 | Hoyos et al. | 382/137 |
| 2002/0041713 A1 * | 4/2002 | Imagawa et al. | 382/229 |
| 2002/0144026 A1 * | 10/2002 | Dunlap et al. | 710/16 |
| 2002/0176628 A1 * | 11/2002 | Starkweather | 382/229 |
| 2003/0028522 A1 | 2/2003 | Collins-Thompson | |
| 2003/0179400 A1 * | 9/2003 | Kofman et al. | 358/1.13 |
| 2003/0231335 A1 * | 12/2003 | Walsh et al. | 358/1.15 |
| 2004/0012803 A1 * | 1/2004 | Chiu | 358/1.13 |
| 2004/0057071 A1 * | 3/2004 | Lin et al. | 358/1.15 |
| 2004/0202386 A1 * | 10/2004 | Quine | 382/305 |

\* cited by examiner

*Primary Examiner*—Twyler L. Haskins
*Assistant Examiner*—Pawandeep S Dhingra (57) ABSTRACT

A method is directed to using a multifunction printer to identify pages of a printed document that have a specified text string. The method comprises electronically converting, with the multifunction printer, a plurality of pages of the printed document to a plurality of electronic text pages corresponding to the printed pages. The multifunction printer electronically searches the plurality of electronic text pages to identify which electronic text pages include the specified text string. The multifunction printer then communicates the identified electronic text pages to the user.

15 Claims, 4 Drawing Sheets

METHOD AND SYSTEM OF USING A MULTIFUNCTION PRINTER TO IDENTIFY PAGES HAVING A TEXT STRING

BACKGROUND OF THE INVENTION

With the advent of computers, society expected to gain mastery over its information. Hope abounded that we could see a paperless office, and that we could readily find any information that existed in nearly unlimited forms of delivery.

However, we have learned that people still enjoy reading on printed paper. We also have learned that because we read and handle so much information, we frequently remember reading something important to us, but cannot remember where we read it. We then become frustrated in our desire to quickly access the particular source or document where we remember seeing the topic of interest. If an electronic copy of the document or source exists, then we can perform an electronic keyword search with a computer to reveal the desired document and/or passage of text. However, an electronic copy of the document may not be available to facilitate electronic keyword searching and a computer is not always available to assist in that process.

Accordingly, in some respects, the information age appears to have made access to information less convenient, rather than more convenient.

SUMMARY OF THE INVENTION

A method of the present invention is directed to using a multifunction printer to identify pages of a printed document that have at least one specified text string. One embodiment of the method comprises electronically converting, with the multifunction printer, a plurality of pages of the printed document to a plurality of electronic text pages corresponding to the printed pages. The multifunction printer electronically searches the plurality of electronic text pages to identify which electronic text pages include the at least one specified text string. The multifunction printer then communicates the identified electronic text pages to the user.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. Other embodiments may be utilized and structural or logical changes may be made without departing from the scope of the present invention. The following detailed description, therefore, is not to be taken in a limiting sense, and the scope of the present invention is defined by the appended claims. Finally, although a flow chart in the figures of this application show a specific order of execution, the order of execution may differ from that what is depicted. All such variations are within the scope of the present invention.

Figure 1:
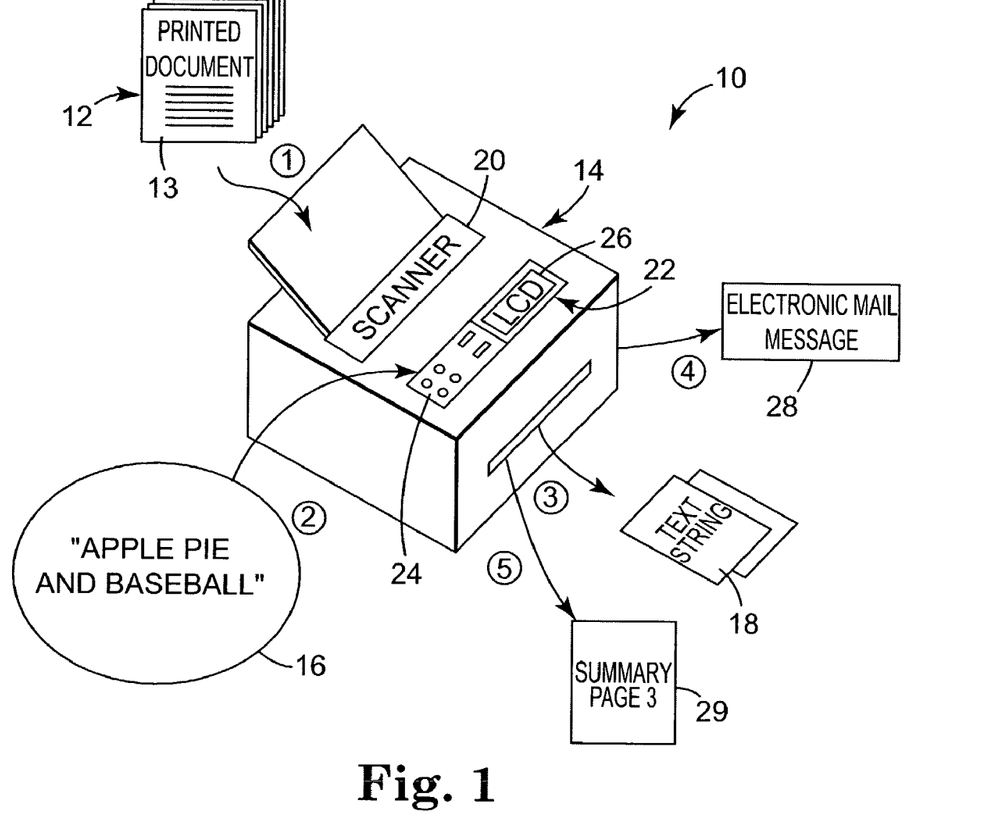
FIG. 1 is a schematic illustration of a method of using a multifunction printer to identifying pages of a printed document that have a specified text string, according to an embodiment of the present invention.

One exemplary embodiment of the present invention is shown generally in FIG. 1 as system and method 10. In method 10, printed document 12 is scanned by scanner 20 of multifunction 14 and processed by optical character recognition processes (shown later in FIG. 2) to produce electronic text pages corresponding to printed pages 13 of printed document 12 (as shown by directional arrow 1). Using text string 16 (e.g., "APPLE PIE AND BASEBALL") entered at user interface 22 via keypad 24 and display 26, multifunction printer 14 searches the electronic text pages (not shown) to identify those pages that include text string 16 (as shown by directional arrow 2). Multifunction printer 14 then prints only the identified electronic text pages that include text string 16 as printed pages 18 (as shown by directional arrow 3). Alternatively, multifunction printer 14 is equipped to digitally send the identified electronic text pages as electronic mail message 28 (as shown by directional arrow 4), or to print summary page 29 that list the identified electronic pages by page numbers or other means (as shown by directional arrow 5).

Accordingly, method 10 of the present invention permits multifunction printer 14 to search through multiple pages 13 of printed document 12 for a particular text string(s) 16 and then print out only those pages that include text string 16. Method 10 is performed independent of a computing device, although communication with or connection to a computing device is not precluded.

Figure 2:
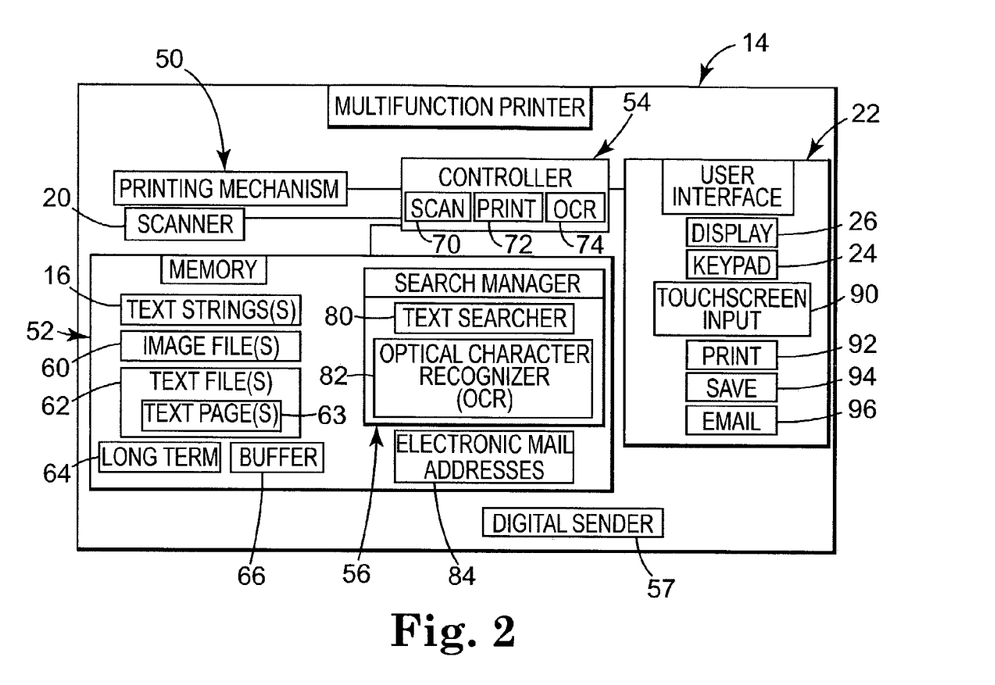
FIG. 2 is a block diagram of a multifunction printer, according to an embodiment of the present invention.

FIG. 2 illustrates multifunction printer 14 in greater detail. As shown in FIG. 2, multifunction printer 14 includes scanner 20, user interface 22, printing mechanism 50, memory 52, controller 54, and digital sender 57.

Printing mechanism 50 comprises a well-known printer technology for printing pages from electronic text files 62 stored in memory 52.

Memory 52 includes one or more text strings 16, one or more digital image files 60, and one or more electronic text files 62. Memory 52 is configured as long-term memory 64 or as short-term memory in buffer 66. In particular, long term memory 64 is used to keep a digital image file 60 or electronic text file 62 for an extended period of time beyond the immediate time required to apply method 10 of the present invention to produce printed pages 18 having text string 16. Buffer 66 of memory 52 acts as short term memory for holding data related to scanning and/or optical character recognition, as well as for storing digital image files 60 and/or electronic text files 62, for a period of time just long enough to produce printed pages 18 having text string 16. Memory 52 also optionally stores electronic mail addresses 84 for use in digitally sending (via digital sender 57) identified electronic text pages that include text string 16 to a desired user.

Memory 52 of multifunction printer 12 comprises computer readable media, stores any related software, and can include any combination of volatile or non-volatile memory, such as floppy disks, hard disks, CD-ROMs, flash memory, read-only memory (ROM), and random access memory (RAM).

Controller 54 of multifunction printer 14 directs operation of all components and functions of printer 12, and optionally comprises any one of, or all of, scan function 70, print function 72, and optical character recognition function 74. Controller 54 preferably includes hardware, software, firmware or combination of these. In one preferred embodiment, controller 54 includes a microprocessor-based system or other system capable of performing a sequence of logical operation and including memory for storing information. Alternatively, controller 54 is incorporated into an application specific integrated circuit (ASIC) which includes hardware, software, and/or firmware for providing scan function 70, print function 72, and/or optical character recognition (OCR) function 74.

Search manager 56 is stored in memory 52 and is accessible via user interface 22. Search manager 56 acts in cooperation with controller 54 to carry out functions of multifunction printer 14 related to identifying printed pages 13 of printed document 12 having text string 16.

Search manager 56 comprises, among other things, text searcher 80 and optical character recognizer 82. Text searcher 80 performs searching for alphanumeric or symbolic characters in an electronic text file 62 to identify one or more text strings 16 in one or more pages 63 of electronic text file 62. Optical character recognizer 82 cooperates with OCR function 74 of controller 54 to convert digital image file 60, obtained from scanner 20 and scan function 70, into electronic text file 62. Search manager 56 is described in greater detail in association with FIG. 3.

User interface 22 of multifunction printer 14 is used to access and manage all of the conventional features of multifunction printer 14 (e.g., start printing, stop printing, etc.), as well as for reviewing and managing features of multifunction printer 14 in accordance with an embodiment of the present invention, such as searching for text string 16 in printed document 12.

User interface 22 comprises keypad 24, display 26, optional touchscreen input 90, print function 92, save function 94, and electronic mail function 96. Keypad 24 permits entry of alphanumeric and/or symbolic characters to form text string 16 that will be used by text searcher function 80 of search manager 56. Display 26 shows results of use of keypad 24 and the status of functions of multifunction printer 14, including search manager 56. Touchscreen input 90 is optionally provided as part of display 26 to permit operation of functions of multifunction printer 14 through display 26 and to permit entry of text string 16.

Print function 92 of user interface 22 permits activation of printing mechanism 50 while save function 94 permits storage of digital image file 60 (from scanning) and/or electronic text file 62 (from optical character recognition) in memory 52. Print function 92 is further used, in cooperation with search manager 56, to specify that the results of the text string search of printed document 12 are to be printed as pages 18. Alternatively, electronic mail (email) function 96 is used, in cooperation with search manager 56, to specify that results of text string search of printed document 12 are to be digitally sent from multifunction printer 14 as an electronic mail message 28 using an electronic mail address 84 (from memory 52), which is entered by keypad 24 or retrieved from memory 52.

Figure 3:
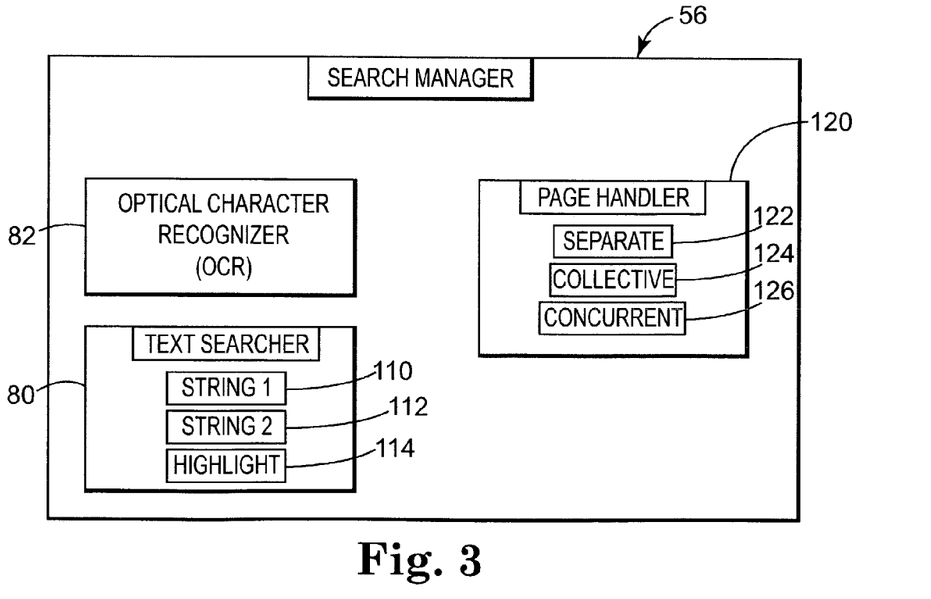
FIG. 3 is block diagram of a text search manager, according to an embodiment of the present invention.

FIG. 3 illustrates search manager 56 in greater detail. As shown in FIG. 3, search manager 56 comprises optical character recognizer 82, and text searcher 80, which is configured for specifying one or more text strings to be searched, such as text string 110 and text string 112. Text searcher 80 also comprises highlight function 114 for indicating that text string 16 be highlighted (e.g., italicized, underlined, made bold) when pages 18 are printed or emailed so that it is easier for a user to find text string in printed pages 18.

Search manager 56 cooperates with controller 54 to operate select functions of controller 54, such as scan function 70, print function 72, and OCR function 76, as well as to implement text search function 82 for keyword and/or character searching.

Search manager 56 also comprises page handler 120 including separate function 122, collective function 124, and concurrent function 126. Page handler function 120 cooperates with optical character recognition function 82 and text searcher functions 82 to instruct text search manager 56 on when and how to implement those functions 80, 82.

Separate function 122 of page handler function 120 permits a user to request that, in the steps of scanning, optical character recognition, and printing in method 10, each page of printed document 12 will be handled separately by multifunction printer 14. In other words, a single page of printed document 12 is scanned separately to create its own digital image file and then only that page is submitted for optical character recognition to produce an electronic text page, and finally the text string search is applied to that single electronic text page and printed if that page includes the specified text string. Each subsequent page 13 of printed document 12 is handled in this manner, effectively processing pages 13 of printed document 12 in series.

Collective function 124 of page handler 120 permits a user to request that, in the steps of scanning, optical character recognition, and printing in method 10, all of the pages of printed document 12 are handled together by multifunction printer 14. In other words, all of the pages 13 of printed document 12 are scanned together to create a single digital image file (including all of the scanned pages) and then all of the pages are submitted together for optical character recognition to produce electronic text file 62 including a corresponding electronic version of all of the pages 13 of printed document 12. Finally the text string search is applied to all of the pages 63 of electronic text file 62 and then only those pages including specified text string 16 are printed. Accordingly, collective function 124 causes multifunction printer 14 to process all of the pages 13 of printed document 12 in one batch.

Concurrent function 126 of page handler 120 permits a user to direct the optical character recognizer 82, printing mechanism 50, and scanner to operate concurrently. For example, one page can be processed by optical character recognition function 82 while another page is being scanned, and yet a different electronic text page is being printed. This feature causes immediate printing of positive results of identified pages (those pages having text string 16) so that the user need not wait for all the pages to be scanned and/or optically recognized before pages with the text string are printed.

Figure 4:
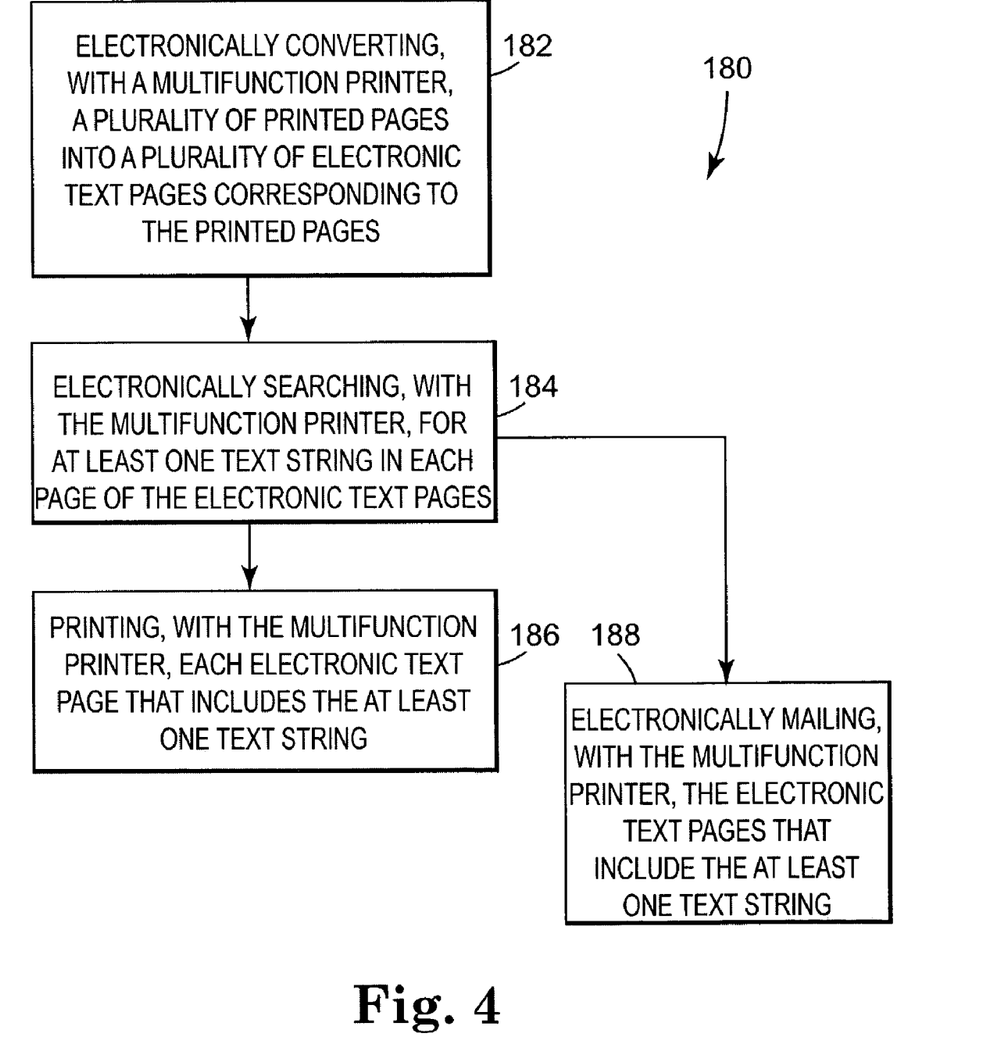
FIG. 4 is a flow diagram of a method of identifying printed document pages, according to an embodiment of the present invention.

FIG. 4 is a flow diagram schematically illustrating method 180 of the present invention for using a multifunction printer to search for a text string in a printed document, independent of a computing device, and then print only those pages of the printed document that include the text string.

Method 180 comprises electronically converting, with a multifunction printer 14, a plurality of printed pages 13 of printed document 12 into a plurality of electronic text pages 63 corresponding to the printed pages 13 (shown by box 182). This aspect of method 180 is typically performed by first scanning the plurality of printed pages with scanner 20 of multifunction printer 14 (FIG. 1) to produce digital image file 60, and then performing an optical character recognition function 74,82 on digital image file 60 to produce a plurality of electronic text pages 63 (FIG. 2) corresponding to the plurality of pages 13 of printed document 12.

Multifunction printer 14 is also used to electronically search in each page of the electronic text pages 63 for at least one text string 16 (shown by box 184). This aspect of method 180 also includes specifying or entering into user interface 22 of multifunction printer 14 the text string 16 on which the electronic search will be performed (FIG. 1). Entering text string 16 into multifunction printer 14 can be performed before, during, or after electronically converting printed document 12.

As shown in box 186, method 180 also includes using multifunction printer 14 to print each electronic text page 63 that includes the one or more specified text strings 16 as a printed page 18 (FIG. 1). As also shown in box 188, instead of, or in addition to, printing the identified pages 18, multifunction printer 14 also optionally is used to digitally send the identified electronic text pages 63 that include the one or more text strings 16 as an electronic mail message 28 (see FIG. 1). In either capacity, multifunction printer 14 communicates the results of the text search to user regarding which pages 13 have text string 16. This communication optionally includes, as shown in FIG. 1, printing summary page 29 detailing those results rather than printing each identified page in which text string 16 was found.

Figure 5:
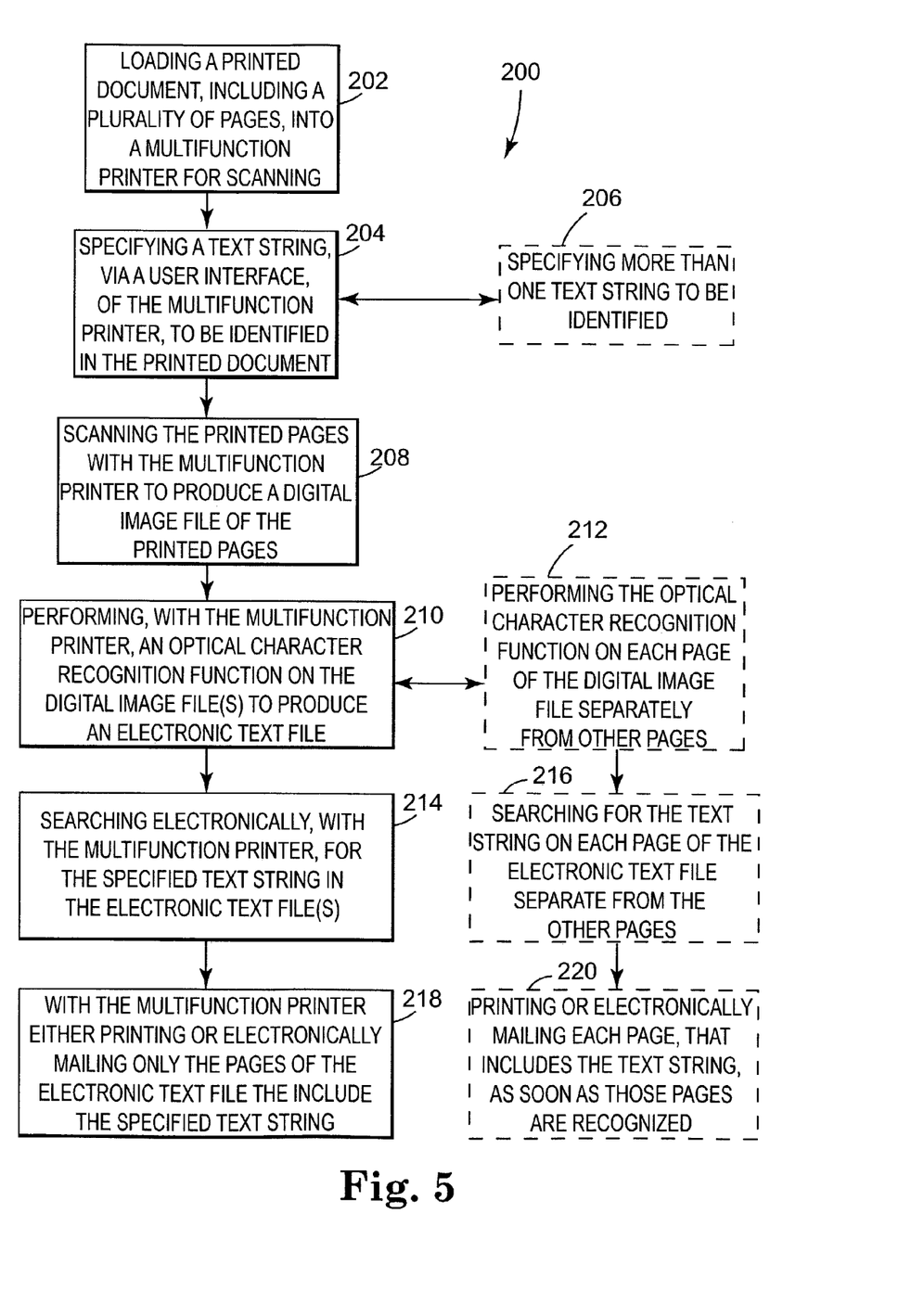
FIG. 5 is a flow diagram of a method of identifying printed document pages, according to an embodiment of the present invention.

As shown in FIG. 5, method 200 of the present invention presents a more detailed aspect of identifying printed document pages, in accordance with an embodiment of the present invention. As illustrated at 202, method 200 includes loading printed document 12 of a plurality of pages 13 into multifunction printer 14 for scanning (FIG. 1). As illustrated at 204, via a user interface 22 of multifunction printer 14, text string(s) 16 is specified for identification in the individual pages 13 of printed document 12 (FIG. 1). This aspect of method 200 optionally includes specifying more than one text string 16 for identification in the pages 13 of printed document 12 (box 206).

As illustrated at 208, method 200 further comprises scanning the printed pages 13 with scanner 20 of multifunction printer 14 to produce digital image file 60 of printed pages 13.

As illustrated at 210, multifunction printer 14 then performs an optical character recognition function on the digital image file(s) to produce an electronic text file 62 of a plurality of electronic text pages 63. This function optionally includes performing the optical character recognition function on each page of digital image file 60 separately from the other pages of the digital image file 60 (as illustrated at 212).

Using multifunction printer 14, the entire electronic text file 62 or electronic text page(s) 63 are searched to identify whether they include the specified one or more text strings 16 (as illustrated at 214). This aspect of method 200 optionally comprises searching for text string(s) 16 on each page 63 of electronic text file 62 separately from the other pages 63 of the electronic text file 62 (as illustrated at 216).

As illustrated at 218, after all the electronic text pages 63 that include text string 16 have been identified through electronic searching, multifunction printer 14 then either prints the identified electronic text pages 63 as printed pages 18 or digitally sends the identified electronic text pages 63 as an electronic mail message 28 to a specified electronic mail address 84 (FIG. 1). This aspect of method 200 optionally includes printing or electronically mailing each electronic text page 63, that includes text string 16, as soon as those pages are identified through searching (box 220).

A method and system of the present invention is directed to using a multifunction printer, independent of a computing device, to identify pages of a printed document that include a text string and then print only those identified pages with the multifunction printer. This method and system of the present invention saves a user from having to thumb through many pages of a printed document to find a particular passage of text or text string of interest. Moreover, this result is obtained without the use of a computing device connected to the multifunction printer.

While specific embodiments have been illustrated and described, herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the chemical, mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A method of using a multifunction printer comprising:
   electronically converting, via the multifunction printer and independent of a computer, a plurality of printed pages to a plurality of electronic text pages corresponding to the printed pages;
   electronically specifying, via a user interface of the multifunction printer and independent of a computer, at least one text string, wherein the electronic specification of the at least one text string is performed prior to or during the electronic conversion of the plurality of printed pages;
   electronically searching, via the multifunction printer and independent of the computer, in the plurality of electronic text pages to identify which electronic text pages include the at least one specified text string, wherein the electronically searching is performed immediately after the electronic conversion of the respective printed pages; and
   communicating to a user, via the multifunction printer and independent of the computer without further interaction of the user at the user interface, the identified electronic text pages via at least one of:
      automatically printing, via the multifunction printer and independent of the computer, the identified electronic text pages as soon as those respective electronic text pages are identified as having the at least one text string; or
      automatically printing, via the multifunction printer and independent of the computer, a summary of the identified electronic text pages, as soon as those respective electronic text pages are identified as having the at least one text string.

2. The method of claim 1 wherein electronically converting comprises:
   scanning the plurality of pages of the printed document, via the multifunction printer and independent of the computer, to produce a digital image file; and
   performing an optical character recognition function on each page of the digital image file to produce a plurality of electronic text pages which correspond to the plurality of pages of the printed document.

3. The method of claim 2 wherein scanning the digital image file comprises producing a plurality of digital image pages, with each digital image page corresponding to each page of the printed document; and
   wherein performing the optical character recognition function comprises performing the optical character recognition function on each of the digital image pages to produce a plurality of electronic text pages corresponding to the pages of the printed document.

4. A method of identifying one or more pages of a printed document that include at least one specified text string, the method comprising:

scanning the pages of the printed document, exclusively via the multifunction printer, to produce a digital image file of the pages of the printed document;

specifying at least one text string, exclusively via a user interface of the multifunction printer prior to or during scanning of the pages, that is to be identified in the pages of the printed document;

performing, exclusively via the multifunction printer, an optical character recognition function on the digital image file to produce an electronic text file corresponding to the pages of the printed document;

automatically, electronically searching, exclusively via the multifunction printer, the electronic text file to identify electronic text pages of the electronic text file that include the at least one specified text string;

automatically communicating, exclusively via the multifunction printer without further user engagement of the user interface and without displaying the identified electronic text pages at the multifunction printer, only the identified electronic text pages, via at least one of:

automatically printing the identified electronic text pages exclusively via the multifunction printer as soon as the respective identified electronic text pages are identified as including the at least one specified text string; or automatically printing a summary of the identified electronic text pages exclusively via the multifunction printer as soon as all of the respective identified electronic text pages are identified as including the at least one text string.

5. The method of claim 4 wherein scanning the pages includes scanning each page separately so that each page produces a separate digital image file.

6. The method of claim 5 wherein performing an optical character recognition function comprises performing the optical character recognition function on each page of the digital image file to produce a separate electronic text page for each page of the printed document.

7. A multifunction printer comprising:

a user interface configured to specify at least one text string prior to scanning of a plurality of printed pages of a printed document;

a scanner configured to convert the plurality of printed pages to a series of electronic page images corresponding to the plurality of printed page, respectively;

a memory;

a search manager stored in the memory and configured to direct an optical character recognition of the plurality of electronic page image to produce a plurality of electronic text pages corresponding to the electronic page images, respectively, and configured to direct electronic searching to identify at least one electronic text page of the plurality of electronic text pages that includes the at least one text string; and a printing mechanism configured for printing the at least one identified electronic text pages, wherein the scanner, the memory, and the printing mechanism are configured to operate independently of a computer, further wherein the search manager includes a page handler mechanism comprising a concurrent function configured to direct immediate, automatic printing of the identified electronic text pages without display at the user interface simultaneously with scanning of additional printed pages and optical recognition of additional digital image files.

8. The multifunction printer of claim 7 wherein the user interface comprises at least one of:

a key pad configured to receive alphanumeric or symbolic text strings;

a display configured for displaying functions of multifunction printer including display of text string being searched;

an electronic mail function configured to permit specifying an electronic mail address to which the identified electronic text pages will be digitally sent by multifunction printer;

a print function configured to permit specifying that the identified electronic text pages be printed by multifunction printer as printed pages; and a save function configured to permit specifying that the identified electronic text pages be saved in the memory of the multifunction printer.

9. The multifunction printer of claim 7 wherein the search manager comprises:

a page handler function configured for specifying whether the optical character recognition and the text search are employed separately on each page, employed collectively on all of the pages, or concurrently.

10. A multifunction printer, independent of a computer, comprising:

means for automatically converting at least one printed pages of a printed document into an electronic text file including a plurality of electronic text pages;

means for specifying, prior to or during operation of the means for automatically converting, at least one text string for identification within the electronic text file;

means for searching for at least one text string within the electronic text file to identify any electronic text pages within the electronic text file that include the at least one text string; and means for automatically printing, without displaying, the identified pages immediately upon identification of the identified respective electronic text pages.

11. The multifunction printer of claim 10 wherein the means for automatically converting comprises:

means for obtaining a digital image of the at least one printed pages; and means for converting the digital image into the electronic text file.

12. The multifunction printer of claim 11 wherein the means for obtaining a digital image includes a scanner and the means for converting the digital image includes an optical character recognition function.

13. A computer-readable medium having computer-executable instructions for performing a method of identifying pages within a plurality of pages of a printed document that include at least one text string, the method being performed exclusively via a multifunction printer that is independent of a computer with the method comprising:

obtaining a digital image file of the plurality of pages of the printed document;

converting the digital image file to an electronic text file including a plurality of electronic text pages corresponding to the plurality of pages of the printed document;

prior to or during converting the digital image file, specifying at least one text string;

immediately after conversion, automatically searching the plurality of electronic text pages to identify which electronic text pages include the at least one text string; and automatically printing at the multifunction printer, immediately upon identification and without further user interaction and without graphic display at the multifunction printer, only the identified electronic text pages.

14. The method of claim 4, comprising:

storing the electronic text file and the digital image file in a buffer of a memory of the multifunction printer for a period of time extending only through completion of the automatic printing of the at least one identified electronic text pages or the automatic printing of the summary of the identified electronic text pages.

15. The multifunction printer of claim 7 wherein the printing mechanism provides the exclusive means for communicating the at least one identified electronic text pages.

* * * * *

UNITED STATES PATENT AND TRADEMARK OFFICE
CERTIFICATE OF CORRECTION

| | | |
|---|---|---|
| PATENT NO. | : 7,391,527 B2 | Page 1 of 1 |
| APPLICATION NO. | : 10/425234 | |
| DATED | : June 24, 2008 | |
| INVENTOR(S) | : Cory Irwin et al. | |

It is certified that error appears in the above-identified patent and that said Letters Patent is hereby corrected as shown below:

In column 8, line 48, in Claim 11, delete "pages" and insert -- page --, therefor.

Signed and Sealed this

Eleventh Day of November, 2008

JON W. DUDAS
*Director of the United States Patent and Trademark Office*